(12) United States Patent  (10) Patent No.: US 8,654,883 B2
Harel et al.  (45) Date of Patent: Feb. 18, 2014

(54) SYSTEMS AND METHODS FOR ENHANCED RF MIMO SYSTEM PERFORMANCE

(71) Applicant: Magnolia Broadband Inc., Warren, NJ (US)

(72) Inventors: Haim Harel, New York, NY (US); Kenneth Kludt, Bedminster, NJ (US); Eduardo Abreu, Allentown, PA (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 13/630,146

(22) Filed: Sep. 28, 2012

(65) Prior Publication Data

US 2013/0322558 A1  Dec. 5, 2013

Related U.S. Application Data

(60) Provisional application No. 61/652,743, filed on May 29, 2012, provisional application No. 61/657,999, filed on Jun. 11, 2012, provisional application No. 61/665,592, filed on Jun. 28, 2012.

(51) Int. Cl.
 *H04B 7/02* (2006.01)
(52) U.S. Cl.
 USPC .......................... 375/267; 375/260; 375/259
(58) Field of Classification Search
 USPC ......................................... 375/267, 260, 259
 See application file for complete search history.

(56) References Cited

U.S. PATENT DOCUMENTS 6,226,507 B1  5/2001  Ramesh et al.
6,321,077 B1  11/2001  Saitoh et al.
6,377,783 B1  4/2002  Lo et al.
6,927,646 B2  8/2005  Niemi
6,987,958 B1  1/2006  Lo et al.
7,257,425 B2  8/2007  Wang et al.
(Continued)

FOREIGN PATENT DOCUMENTS

EP  1 867 177  5/2010
EP  2 234 355  9/2010
(Continued)

OTHER PUBLICATIONS

Office Action issued by the United States Patent and Trademark Office for U.S. Appl. No. 13/762,159 dated Apr. 16, 2013.

(Continued)

*Primary Examiner* — Michael Neff
(74) *Attorney, Agent, or Firm* — Pearl Cohen Zedek Latzer Baratz, LLP

(57) ABSTRACT

A system for enhancing performance of a multiple-input-multiple-output (MIMO) receiving system is provided. The performance enhancement system includes a MIMO receiving system having N branches and is configured to operate in accordance with one or more legacy MIMO receiving classes, types and schemes; a radio distribution network (RDN) connected to the MIMO receiving system and including one or more beamformers, wherein at least one of the beamformers is being fed by two or more antennas so that a total number of the antennas in the system is M which is larger than N; and a control module configured to tune the one or more beamformers based on legacy MIMO signals derived from the MIMO receiving system in various methods depending on the MIMO class/type, so that the RDN adds gain and antenna directivity to the MIMO receiving system.

21 Claims, 7 Drawing Sheets

(56) References Cited

U.S. PATENT DOCUMENTS

| | | |
|---|---|---|
| 7,499,109 B2 | 3/2009 | Kim et al. |
| 7,742,000 B2 | 6/2010 | Mohamadi |
| 7,769,107 B2 | 8/2010 | Sandhu et al. |
| 7,898,478 B2 | 3/2011 | Niu et al. |
| 8,155,613 B2 | 4/2012 | Kent et al. |
| 8,294,625 B2 | 10/2012 | Kittinger et al. |
| 8,369,436 B2 | 2/2013 | Stirling-Gallacher |
| 8,509,190 B2 | 8/2013 | Rofougaran |
| 2004/0125900 A1 | 7/2004 | Liu et al. |
| 2005/0129155 A1 | 6/2005 | Hoshino |
| 2005/0245224 A1 | 11/2005 | Kurioka |
| 2005/0287962 A1 | 12/2005 | Mehta et al. |
| 2006/0135097 A1 | 6/2006 | Wang et al. |
| 2006/0264184 A1 | 11/2006 | Li et al. |
| 2006/0270343 A1* | 11/2006 | Cha et al. ............... 455/25 |
| 2008/0051037 A1 | 2/2008 | Molnar et al. |
| 2008/0144737 A1 | 6/2008 | Naguib |
| 2008/0238808 A1 | 10/2008 | Arita et al. |
| 2009/0028225 A1 | 1/2009 | Runyon et al. |
| 2009/0121935 A1 | 5/2009 | Xia et al. |
| 2009/0268616 A1 | 10/2009 | Hosomi |
| 2009/0322613 A1 | 12/2009 | Bala et al. |
| 2010/0172429 A1 | 7/2010 | Nagahama et al. |
| 2010/0285752 A1 | 11/2010 | Lakshmanan et al. |
| 2011/0032972 A1* | 2/2011 | Wang et al. ............. 375/130 |
| 2011/0150050 A1* | 6/2011 | Trigui et al. ............. 375/219 |
| 2011/0249576 A1 | 10/2011 | Chrisikos et al. |
| 2011/0273977 A1* | 11/2011 | Shapira et al. .......... 370/208 |
| 2011/0281541 A1 | 11/2011 | Borremans |
| 2012/0020396 A1 | 1/2012 | Hohne et al. |
| 2012/0033761 A1 | 2/2012 | Guo et al. |
| 2012/0230380 A1 | 9/2012 | Keusgen et al. |

FOREIGN PATENT DOCUMENTS

| | | |
|---|---|---|
| WO | WO 03/047033 | 6/2003 |
| WO | WO 03/073645 | 9/2003 |
| WO | WO 2011/060058 | 5/2011 |

OTHER PUBLICATIONS

Office Action issued by the United States Patent and Trademark Office for U.S. Appl. No. 13/762,191 dated May 2, 2013.

Office Action issued by the United States Patent and Trademark Office for U.S. Appl. No. 13/762,188 dated May 15, 2013.

Office Action issued by the United States Patent and Trademark Office for U.S. Appl. No. 13/775,886 dated Jul. 17, 2013.

Notice of Allowance issued by the United States Patent and Trademark Office for U.S. Appl. No. 13/762,191 dated Jul. 19, 2013.

Notice of Allowance issued by the United States Patent and Trademark Office for U.S. Appl. No. 13/762,188 dated Aug. 19, 2013.

Partial International Search Report for International Application No. PCT/US2013/043056 dated Sep. 5, 2013.

Notice of Allowance issued by the United States Patent and Trademark Office for U.S. Appl. No. 13/770,255 dated Sep. 17, 2013.

Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.

Office Action issued by the United States Patent and Trademark Office for U.S. Appl. No. 13/889,150 dated Sep. 25, 2013.

* cited by examiner

SYSTEMS AND METHODS FOR ENHANCED RF MIMO SYSTEM PERFORMANCE

CROSS-REFERENCE TO RELATED APPLICATIONS

This application claims the benefit of U.S. Provisional Patent Application No. 61/652,743, filed on May 29, 2012, U.S. Provisional Patent Application No. 61/658,015, filed on Jun. 11, 2012, U.S. Provisional Patent Application No. 61/657,999, filed on Jun. 11, 2012 and U.S. Provisional Patent Application No. 61/665,592, filed on Jun. 28, 2012, all of which are incorporated herein by reference in their entirety.

FIELD OF THE INVENTION

The present invention relates generally to the field of radio frequency (RF) multiple-input-multiple-output (MIMO) systems and in particular to systems and methods for enhanced performance of RF MIMO systems using RF beamforming and/or digital signal processing.

BACKGROUND OF THE INVENTION

Prior to setting forth a short discussion of the related art, it may be helpful to set forth definitions of certain terms that will be used hereinafter.

The term "MIMO" as used herein, is defined as the use of multiple antennas at both the transmitter and receiver to improve communication performance. MIMO offers significant increases in data throughput and link range without additional bandwidth or increased transmit power. It achieves this goal by spreading the same total transmit power over the antennas to achieve spectral multiplexing that improves the spectral efficiency (more bits per second per Hz of bandwidth) or to achieve a diversity gain that improves the link reliability (reduced fading), or increased antenna directivity.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF circuitry that implements beamforming and may include a combiner, switches controllable phase shifters, and in some cases amplifiers.

The term "Receiving Radio Distribution Network" or "Rx RDN" or simply "RDN" as used herein is defined as a group of beamformers as set forth above.

The term "Spatial Multiplexing" as used herein applies to the technique where different MIMO signals streams are transmitted from multiple antennas. Each of these signals is from a set of data streams that is transmitted in a manner (e.g., different pre-coding) to ensure low channel correlation among data streams at the receiver Spatial Multiplexing may be employed in conjunction with beamforming.

The term "autonomous" as used herein describes a process that is performed by one side alone (e.g., the transmit side or the receive side of a communication system), without supporting signaling or feedback from the other side.

The term "collaborative" as used herein describes a process that uses cooperation between both sides of a communication link to assist each other. (e.g., in a communication system, the base station and the user equipment exchange information to assist each other in improving the link).

The term "blind phase scan" as used herein, is an autonomous signal quality enhancing technique, according to which the phase of the receiving antennas is methodically changed while simultaneously monitoring one or more preselected quality indicators such as power control, SINR, Signal to noise ratio (SNR), or some cases a data rate measurement. The phase parameters are periodically tuned and updated so as to optimize the preselected one or more quality indicators.

The term "Maximal Ratio Combining" or "MRC" as used herein, is an autonomous signal quality enhancing technique based on Diversity combining, in which the signals from each channel are added together, and the gain of each channel is made proportionally to the RMS signal level and inversely proportional to the Mean Square noise level.

The term "Optimal Combining" or "OC" as used herein, is an autonomous signal quality enhancing technique based on Diversity combining, in which the signals from each channel are combined together to maximize Signal to Interference plus Noise Ratio (SINR).

The term "Least Mean Squares" or "LMS" as used herein, is an autonomous signal quality enhancing technique in which an equalizer filter processes a signal derived from signals received by a plurality of antennas. In some cases, a filter coefficient correction used by the equalizer filter may be generated by a tap coefficients generator using a least mean square (LMS) algorithm.

The term "interference cancellation" as used herein, is an autonomous signal quality enhancing technique based on selectively removing or reducing undesired interference, in such a way that improves SINR of the desired signal.

The term "downlink transmit beamforming" as used herein, is a collaborative signal quality enhancing technique based on signaling between user equipment (UE) and base transmitter station (BTS), in which the BTS is provided with information received by the UE, regarding the desired tuning of its DL beamforming weights, e.g., using pilot signals coming from the BTS, and the UE sends feedback informing the BTS of desired corrections to be applied to its DL antennas' weights. This MIMO scheme is also referred to as Closed Loop BF.

The term "minimum mean-squared error" or "MMSE" as used herein, is a process for cases where a digital radio-communications systems operating on a jammed frequency-selective fading channel: The receiver performance can be improved by using the joint antenna diversity and equalization techniques to combat both time- and frequency-selective fades and jammers effects. In this process, the optimum, in the sense of MMSE, the structure of the linear equalizer (LE), and the decision feedback equalizer (DFE) for coherent receiver antenna diversity are all being derived for an un-jammed environment.

The term "Transmit Diversity" as used herein, sometimes called "Alamouti Tx Div" refers to a collaborative signal quality enhancing technique, where L transmitting antennas simultaneously emit up to L consecutive symbols, in up to L combinations, so that each given symbol is repeated up to L times, yielding time diversity without sacrificing bandwidth.

Many techniques are known in the art for enhancing signal quality in RF MIMO communication systems. The aforementioned techniques are a mere few and other techniques, currently the RF MIMO signal quality enhancement methods are implemented in the baseband domain, by a baseband DSP module.

FIG. 1 is a high level schematic block diagram illustrating a MIMO receiver system 10 in accordance with the prior art.

A baseband DSP processor 20 is fed by two or more radio circuits 30-1 to 30-N, each of which is in turn fed by its respective antenna 40-1 to 40-N. In operation, baseband DSP processor 20 may apply one or more signal quality-based enhancement techniques, including autonomous or collaborative techniques, or both, that may include, but are not limited to, the techniques discussed above.

There are several issues associated with the aforementioned architecture: Firstly, 3GPP standardization supports several canonical MIMO configurations, e.g., 2×2, 4×4, or 8×8, and consequently, protocols, base stations' software, and UE DSP software products do not currently support a flexible number of UE antennas. Second, the more complex standard configurations (e.g., 8×8) are going to take a while before they are brought to market. Third, the more complex standard configurations would be expensive, since advanced UEs need to support many RF bands (e.g., 7) and when the number of antennas is increased by a factor (e.g., by 1:5), then the RF chains supporting it must grow by such a factor, e.g., from 14 (i.e., 2×7) to 70 (i.e., 10×7), which becomes exceedingly expensive.

BRIEF SUMMARY OF EMBODIMENTS OF THE INVENTION

Embodiments of the present invention address some or all of the aforementioned issues associated with the prior art. A first aspect of embodiments of the invention enables the addition of antennas to existing standards-compliant solutions via a minor addition of hardware and software. A second aspect of embodiments of the invention endows non-complex configurations (e.g., 2×2) that are already commercially available with some of the features that will only become available in years to come. According to a third aspect of embodiments of the invention, due to the wideband nature of some of the invention's versions, there may be less need to extensively duplicate front end RF circuit, for example, two RF beamformers may be able to support all 7 bands, thereby promoting affordability.

Some embodiments of the invention include a hybrid system comprising a legacy MIMO Receiving system including of baseband, radios and antennas (where the number of antennas is equal to the number of radios); a Rx RDN (comprised of an array of beamformers) and a larger number of antennas (larger than the number of radios); and a control module that derives its metrics from the MIMO system and tunes the RDN accordingly.

According to one embodiment of the present invention, there is provided a performance enhancement system for enhancing the performance of a multiple-input-multiple-output (MIMO) receiving system. The performance enhancement system may include a MIMO receiving system having N branches and configured to operate in accordance with one or more legacy MIMO receiving schemes; and a radio distribution network (RDN) connected to the MIMO receiving system. The RDN may comprise one or more beamformers, wherein at least one of the beamformers is fed by two or more antennas. The total number of antennas in the system may be $M=K_1+K_2+\ldots K_N$, where $K_i$ is the number of antennas used by Beamformer i. It will be recognized that since a beamformer typically involves more than one antenna, M will typically be larger than N. A control module is required to tune the one or more beamformers based on legacy MIMO Signals derived from the MIMO receiving system's DSP, so that the RDN adds gain and/or antenna directivity to the MIMO receiving system.

According to another aspect of the present invention, there is provided a method of enhancing the performance of a radio frequency (RF) of a legacy MIMO communication. The method includes deriving legacy MIMO signals from a MIMO receiving system's DSP, where the receiving system includes N branches and is configured to operate in accordance with one or more legacy MIMO receiving schemes; generating beamforming weights for a radio distribution network (RDN) connected to the MIMO receiving system comprised of one or more beamformers, wherein at least one of the beamformers is fed by two or more antennas, so that a total number of the antennas in the system is M>N, and tuning the one or more beamformers' input signal weights, so that the RDN adds gain and/or antenna directivity to the MIMO receiving system.

Some embodiments of the present invention are beneficial when antennas at the user equipment (UE) do not receive a uniform wave-front. The non-uniform wave-front yields unpredictable beam shapes when the antenna elements are combined with phases and amplitude as they are received. Therefore individual tuning of the RDN for each antenna may be beneficial, as will be further explained below.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

Figure 1:
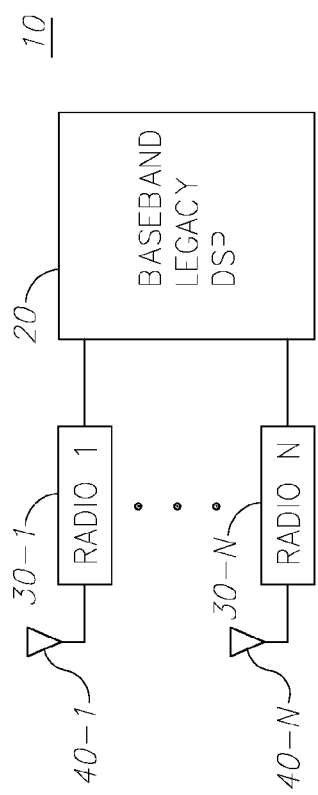
FIG. 1 is a high level schematic block diagram illustrating a MIMO receiver according to the prior art.

The drawings together with the following detailed description make the embodiments of the invention apparent to those skilled in the art.

DETAILED DESCRIPTION OF EMBODIMENTS OF THE INVENTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments or of being practiced or carried out in various ways. Also, it is to be understood that the phraseology and terminology employed herein is for the purpose of description and should not be regarded as limiting.

Figure 2A:
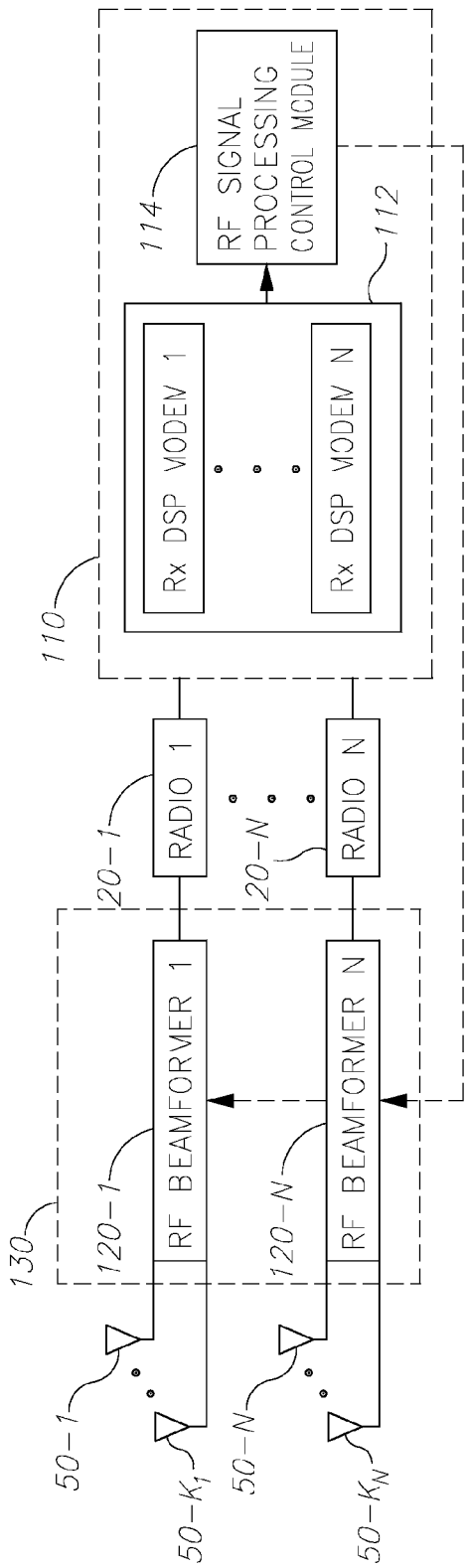
FIG. 2A is a high level schematic block diagram illustrating a system according to some embodiments of the present invention.

FIG. 2A depicts a hybrid of a MIMO receiver system comprising a number of radios, baseband DSP modems and an array of RF beamformers, in accordance with some embodiments of the present invention. Baseband processor 110, possibly in the form of an integrated circuit (IC), may include one or more legacy receiving DSP modems 112. Additionally, the baseband processor 110 may further include an RF signal processing control module 114. Baseband processor 110 is fed by two or more radio circuits 20-1 to 20-N, the outputs of which are input to the respective one or more legacy DSP receiving modems 112. Each one of radio circuits 20-1 to 20-N is fed in turn by a corresponding RF beamforming module (or RF beamformer) 120-1 to 120-N, which together form a receiving radio distribution network (Rx RDN) 130. Additionally, each one of RF beamforming modules 120-1 to 120-N is fed by a plurality of antennas 50-1 to 50-K and may be further tunable by RF signal processing control module 114.

In operation, the Baseband DSP modems 112 and radios 20 may be configured to enhance the communication link via the addition of the Rx RDN and additional antennas. The enhancement may be accomplished by adding RF signal processing control module (or RF Control Module) 114. RF control module 114 may generate beamforming weights (i.e., amplitude and phase) based on various possible processing levels applied to signals obtained from DSP modems 112, and tunes the one or more RF beamforming modules 120-1 to 120-N.

By the aforementioned architecture, RF MIMO receiver systems can be retrofitted and augmented with additional antennas while preserving the legacy signal processing implementation, and reusing existing signals with additional processing, in order to tune additional RF circuitry, i.e., Rx RDN 130, thus enhancing performance.

Figure 2B:
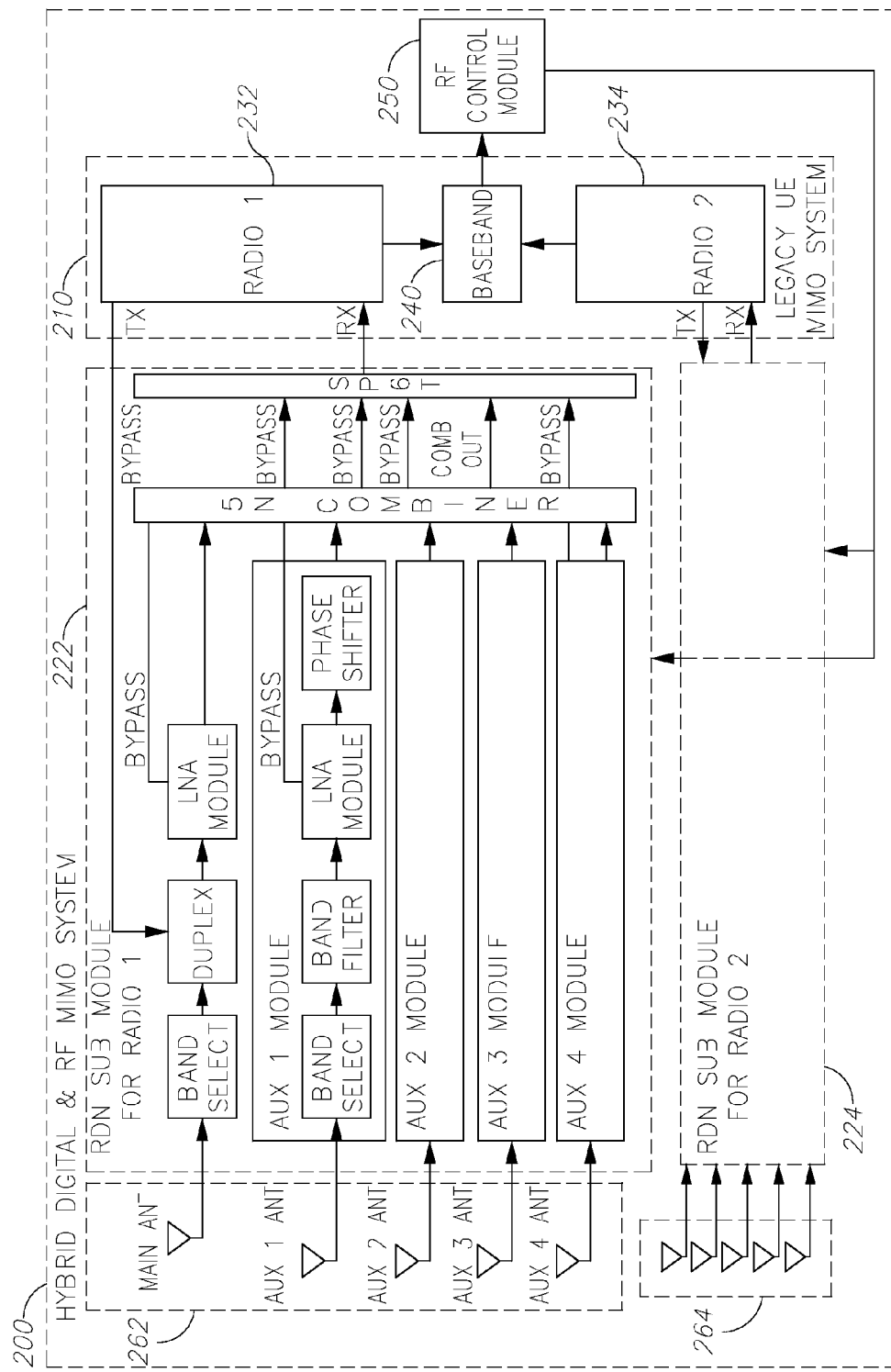
FIG. 2B is a detailed example block diagram of a controllable group of beamformers illustrating an aspect according to some embodiments of the present invention.

FIG. 2B is a block diagram illustrating a non-limiting exemplary implementation of a hybrid digital and RF MIMO system 200 according to embodiments of the present invention. Hybrid system 200 includes a legacy UE MIMO system 210 which includes two or more radio circuits 232 and 234 which feed baseband processor 240. Hybrid system 200 further includes an RDN which includes RDN sub-modules 222 and 224 which include RF circuitry such as RF combiners, filters, phase shifters, amplifiers, and switches. Each one of the RDN sub-modules may be fed in turn, by an array of antennas 262, and 264. Hybrid digital and RF MIMO system 200 may further include an RF control module 250 configured to derive legacy MIMO metrics from legacy UE MIMO system 210 and tune the RDN which includes RDN sub-modules 222 and 224 accordingly.

Figure 3A:
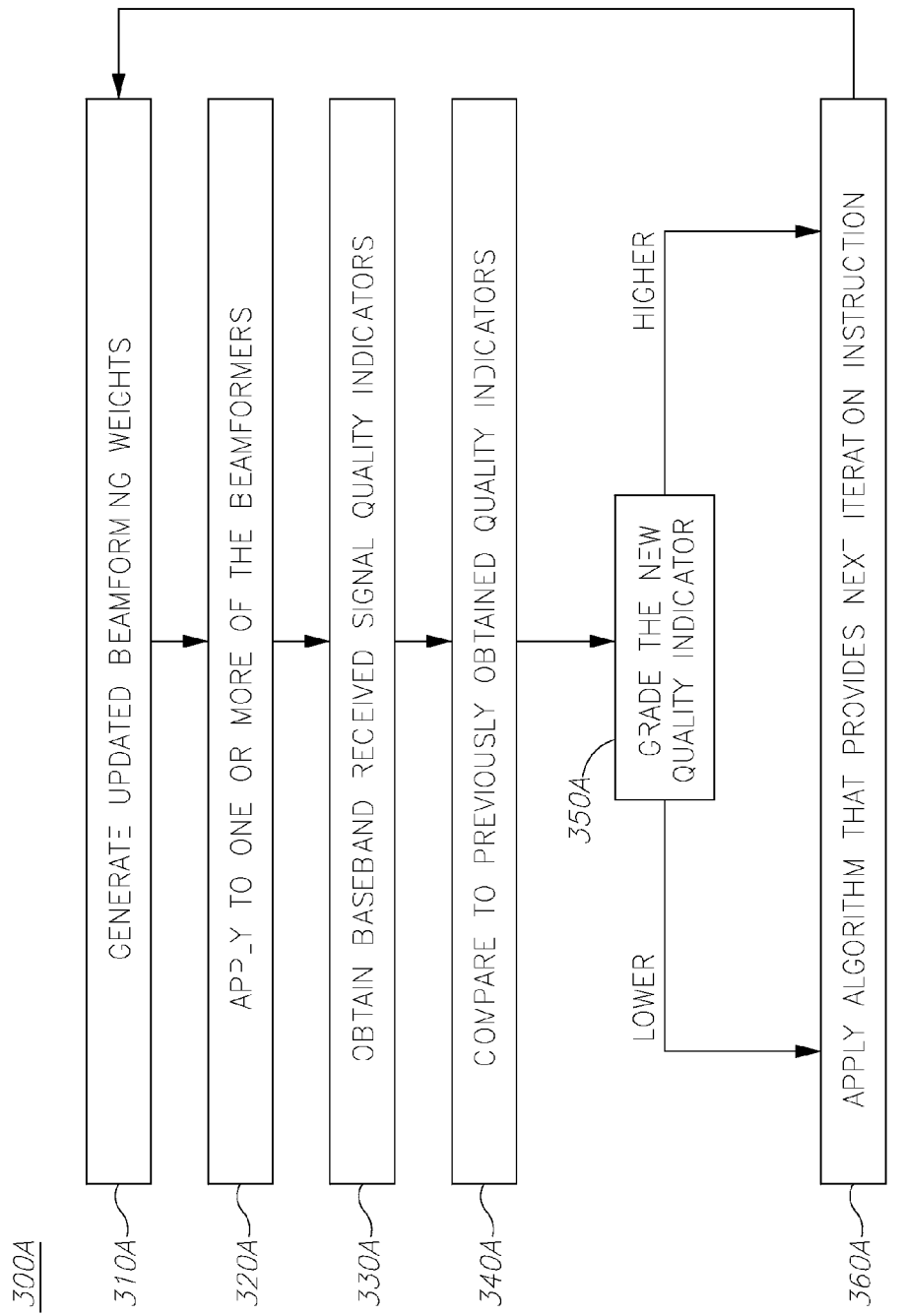
FIG. 3A is a high level flowchart diagram illustrating an aspect of a method according to some embodiments of the present invention.
Figure 3B:
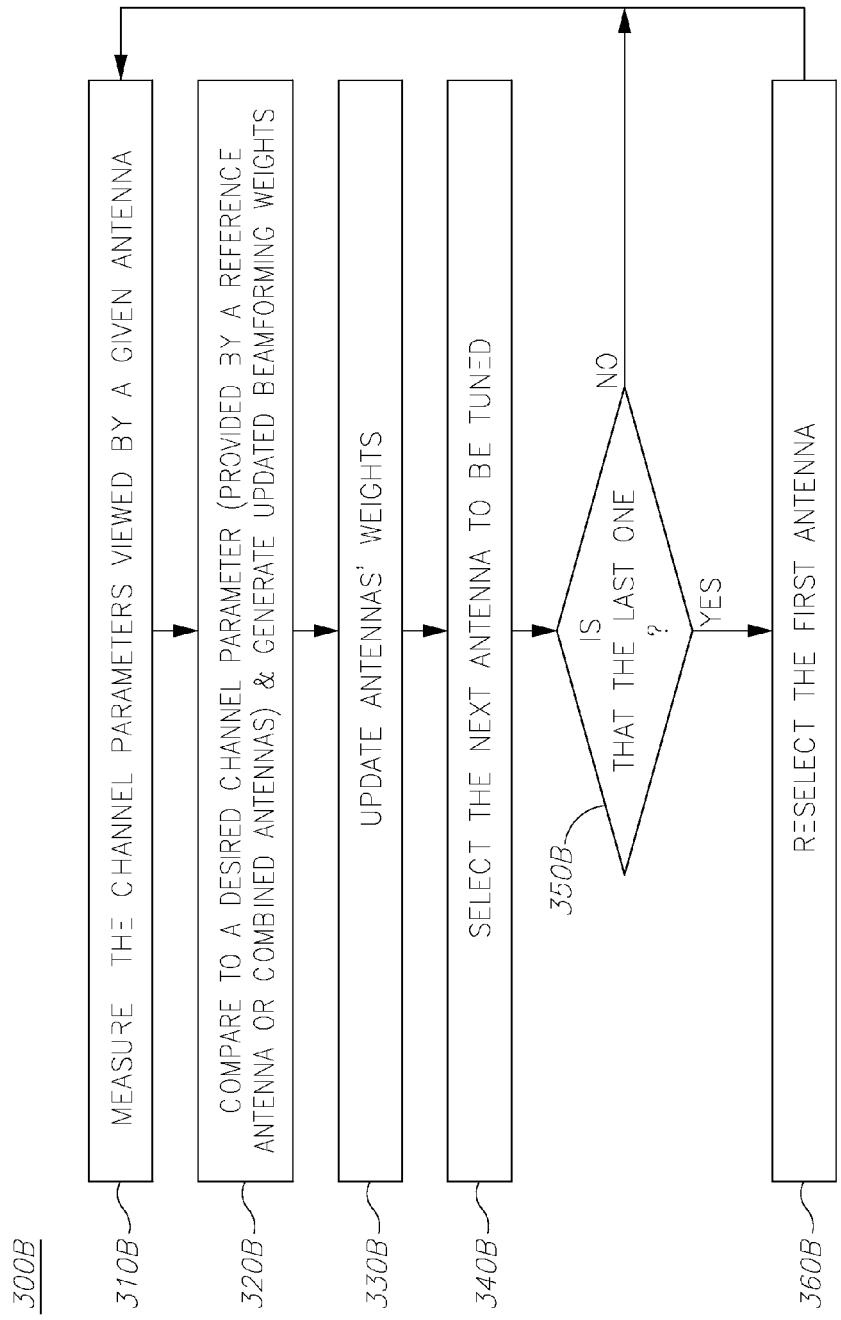
FIG. 3B is a high level flowchart diagram illustrating another aspect of a method according to some embodiments of the present invention.

FIGS. 3A and 3B illustrate possible methods of tuning the beamformer array, based on signals derived from the various MIMO receiver modems, and in some cases on further processing.

FIG. 3A shows an iterative method that applies blind weights by employing various specified techniques, for example, those known in the art. The quality indicators that result from each iteration may be used determine the best weights. Referring to FIG. 3A in more detail, the high level flow chart illustrates the iterative tuning process 300A which is initiated by selecting some beamforming weight (for example, at random) and then modifying it according to some method. Step 310A describes the DSP function that generates a new beamforming weight. Step 320A describes applying the new beamforming weight to the RDN. Step 330A describes monitoring the resultant quality indicator as reported from a given section of the DSP. Step 340A compares the new quality indicator with the previous one. Step 350A grades the weight, and determines if the quality indicator was made better or worse. Step 360A performs an algorithmic function that stores results of the previous and recent iterations and determines the weights.

FIG. 3B describes a method of tuning a RDN beamformer based on channel estimation, i.e. gauging the difference between a given antenna's measured weight (measured phase and amplitude), and its desired weight, where the desired weight is some reference, and modifying that antenna's current setting so as to reduce or minimize that difference. Referring now to FIG. 3B in more detail, a high level flow chart illustrates channel estimation based tuning process 300B. The method systematically and periodically selects antennas and measures their phase and amplitude as described in 310B. Step 320B compares that measurement with a reference. According to an embodiment of the invention, the measurement from one of the antennas may be used as a reference, and measurements from other antennas may be compared against it. According to another embodiment of the invention, a combined signal of more the one antenna may be used as a reference. The comparison may result in a gap, e.g., a non-zero phase difference. Step 320B then reviews the set of possible beamformers' weights, and selects one that reduces or minimizes the difference. Step 330B applies the above determined weight by the control algorithm residing in the baseband, and sets the beamformer that is fed by that antenna accordingly. Step 340B transfers the channel estimation process to the next antenna, and if all antennas have been tuned (Step 350B) the first antenna is revisited, and so on (Step 360B). According to some embodiments of the invention, various classes/types of legacy MIMO receiving systems may be used, such as Maximal Ratio Combining, Optimal Combining, Minimum Mean Square Error, Alamouti Tx Diversity, Interference Cancellation, DL Transmit Beam Forming, Spatial Multiplexing, and others. When tuning the RF beamformers, two basic tuning methods may be practiced. In the first method (hereinafter "Method A"), demodulated signals of a given DSP modems are used to tune the specific corresponding Beamformer that feeds its radio, and in the second method (hereinafter: "Method B"), multiple demodulated signals of the multiple DSP modems are used to tune multiple beamforming in conjunction. Method A is typically easier to implement, requiring smaller added processing to the legacy MIMO modem processors, but provides in general less performance. However, that loss of performance is not the same for each one of the above mentioned MIMO classes/types, as will be described below.

Figure 4:
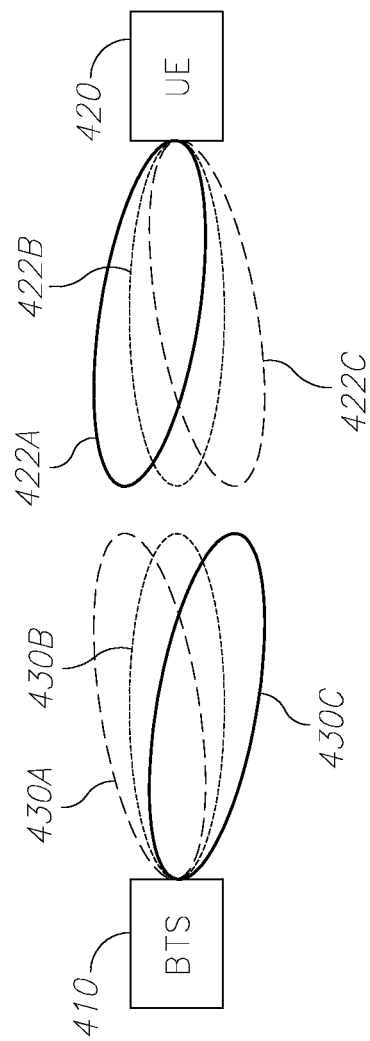
FIG. 4 is a high level block diagram illustrating an aspect related to one case of MIMO mode of downlink beamforming, treated in some embodiments of the present invention.

FIG. 4 is a high level block diagram illustrating a non limiting exemplary aspect according some embodiments of the present invention. When a base station (BTS) 410 is operating in a Downlink Transmit Beamforming mode, and user equipment (UE) 420 is operating in Receive RF beamforming mode according to an embodiment of the invention, it may be beneficial to tune each one of the beamforming sides in such a way that will not compromise or adversely affect either of both the process of tuning the UE antennas and the process of tuning the BTS antenna. That is, the UE measures the channel, and then performs two parallel processes: one is done by the legacy Closed Loop DL beamforming MIMO, the other is done by the RF control module. Since the two different mechanisms operate in parallel, unaware of each other, with different goals—one trying to satisfy the BTS 410 and the other trying to satisfy UE 420—there is a potential risk of instability. This issue is illustrated by the geometric example of beams 422A-422C of UE 420 shown in FIG. 4, where both the BTS' beams 410 and the UE's beams 420 move back and forth trying to point at each other, resulting in instability of both beams.

According to some embodiments of the present invention, whenever downlink (DL) beamforming is being applied by UE 420, the metrics that are obtained from the baseband DSP modules of UE 420 may be measured, by way of example, every frame (or any other specified time unit), however the tuning of the one or more beamformer in UE 420 may be carried out at a lower rate than one command per frame (e.g., multiplied by a factor of 2 or 3). In this embodiment, the corresponding base station beamforming mechanism of BTS 410 may perform both channel estimation and codebook instructions to change the weights at BTS 410 every frame. Such a reduced rate of change at the UE results in a more robust BTS beamforming algorithm, due to reduction of the number of simultaneous changes. Alternatively, the UE may from time to time refrain from advising the BTS how to alter its weights (e.g., hold off making changes to the codebook it sends). In this way, the UE can make weight changes to its own RDN without impacting the BTS performance and thus improve the robustness of the UE and BTS beamforming algorithms.

Figures 5, 6:
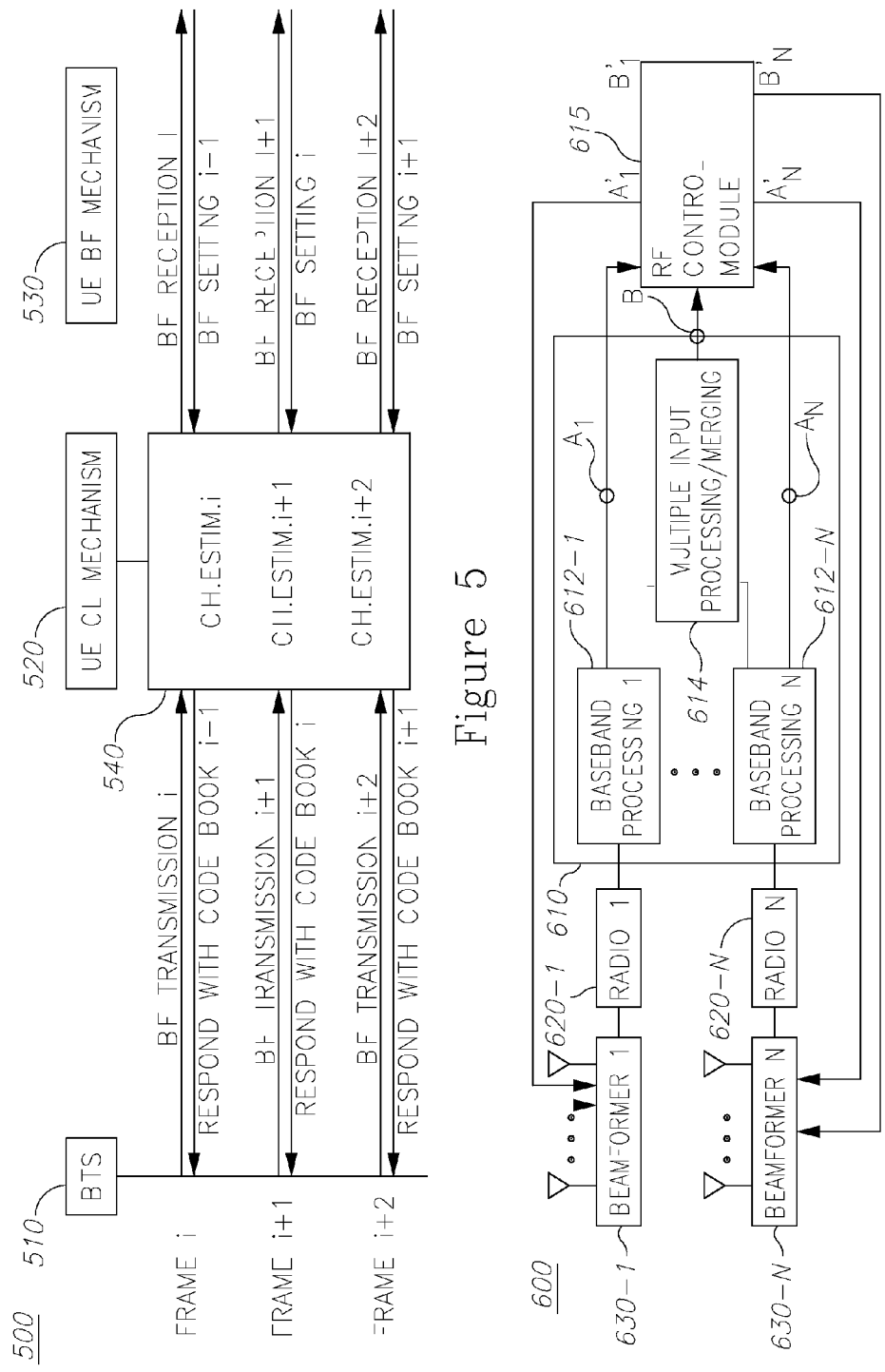
FIG. 5 is a high level block diagram and flow chart illustrating aspects of the MIMO mode illustrated in FIG. 4, according some embodiments of the present invention.
FIG. 6 is a high level block diagram illustrating different possible processing levels used to derive RDN's tuning according to some embodiments of the present invention.

FIG. 5 is a high level timing diagram further illustrating and providing further insight to the aforementioned aspect of changing antenna settings of the UE and the BTS. Timing diagram 500 illustrates channel estimation implemented by a collaborative signal enhancement scheme between BTS 510, the UE closed loop mechanism 520, and the UE beamforming mechanism 530. In operation time slot i, the UE's MIMO assesses the required correction of the BTS weights i+1, while the RF Control Module assesses the required correction for the RDN i+1, and forwards these instructions simultaneously to both. This causes both UE and BTS to modify the signal at both ends, causing the next cycle i+2 to assess a correction that was partly caused by an unrelated mechanism.

Since any antenna setting change at one side generates a channel change for the other side, an undesirable oscillation effect may occur. One solution, as explained above, is to use a reduced change rate. Another solution is that UE beamforming mechanism 530 may learn over time the BTS 510 antenna change pattern (in a static environment), and predict the impact of the beamforming setting change on its own feedback to BTS 510, and selectively correct that feedback.

More specifically, the control module of UE closed loop mechanism 520 may keep logbooks that store recent beamforming weight updates for the one or more beamforming circuits at the UE beamforming mechanism 530 and the BTS 510 beamforming. The logbooks may be used by the control module of UE 520 to estimate a mutual impact of the two processes on each other, and implement a correction. For example, the UE may perform correlation calculations between both logbooks, and if any correlation coefficient exceeds a certain threshold, then the UE may choose to use an alternative RF control module algorithm, and verify that the modified correlation has been properly reduced.

According to some embodiments of the present invention, whenever a tuning of a specified beamformer is carried out while temporarily degrading its performance, the control module may tune the beamformers one at a time, so that when the specified beamformer is engaged in tuning, the other beamformers are not being tuned.

FIG. 6 is a high level block diagram illustrating yet another aspect of a system according to some embodiments of the present invention. RF MIMO receiving system 600 includes a baseband processor 610 that includes a plurality of baseband processors 612-1 to 612-N fed by radio circuits 620-1 to 620-N. Baseband processors 612-1 to 612-N have individual outputs $A_1$ to $A_N$ respectively which are fed into a multiple input processing/merging module 614 which generates a combined output B. MIMO receiving system 600 further includes an RF control module 615 fed by individual outputs $A_1$-$A_N$ and combined output B, which in turn generates control outputs $A'_1$-$A'_N$ when the aforementioned Method A is used, or alternatively control outputs $B'_1$-$B'_N$ when Method B is used.

Depending on the actual MIMO class/type, the baseband signals may be used to tune beamforming circuitries 630-1 to 630-N may be tuned by the A'1 to A'N outputs via a first set of controls lines, or tuned by B'1 to B'N outputs via another set of control lines.

As stated above, the tuning of an individual RF beamformer based on its DSP modems signals can be implemented for all types of MIMO classes/types mentioned above, and is the preferable method when cross-correlation of the noise/interference between the channels is zero or below a predefined threshold.

In other cases, when such cross-correlation between interference is significant or above a predefined threshold, then the RDN assembly of beamformers' tuning may yield better performance when the tuning algorithm takes into account multiple DSP Modems' signals derived from the multiple Radios fed by their multiple beamformers. For these cases it would be advantageous to tune the multiple beamformers as a group, thus implementing a better selection of RDN weights based on more accurate knowledge of the channel.

As stated above, the extra processing required for Method B is not always justified, depending on the particular MIMO class/type as described below.

Where a given UE MIMO receiving systems implements MRC, and when one may assume that this UE choice was made based on preference of simplicity, i.e., relating to interference as less significant, then RDN tuning may use similar assumptions, and thus tunes each individual beamformer based on each individual corresponding DSP modem as described by Method A.

Where a given UE MIMO receiving systems implements OC, and when one may assume that this UE choice is made based on preference, i.e., relating to interference as significant, then RDN tuning may use similar assumptions, and thus tunes multiple beamformers based on multiple DSP modems' signals as described by Method B.

Where a given UE MIMO receiving system implements MMSE, and when one may assume that this UE choice is made based on preference, i.e. relating to interference as significant, then RDN tuning may use similar assumptions, and thus tunes multiple beamformers based on multiple DSP modems' signals as described by Method B.

Where a given UE MIMO receiving systems implements Alamouti Tx Diversity, then Method A is practically possible but less preferable, due to the nature of the Alamouti transmission, rendering the individual DSP modems' signals jamming each other prior to modulation, as well as the need to perform individual deciphering for each one which increase complexity—defeating the purpose of reduced complexity; although possible, Method A for this class is inferior on most respects and so Method B preferably should be used in this class.

Where a given UE MIMO receiving systems implements Interference cancellation, and when the assumption is that the legacy MIMO significantly reduces the interferer impact on each one of the individual DSP's, and when the SINR declared by the legacy MIMO quality indicator is not marginal (Point B), i.e. above a certain level, then Method A for RDN tuning is implemented for this class/type of MIMO receiver system; otherwise, Method B is implemented.

Where a given UE MIMO receiving systems implements DL transmit beamforming, and when SINR declared by the MIMO quality indicator (Point B) is higher than a certain level, Method A will be used to individually tune beamformers via their corresponding DSP modems' signals; where marginal SINR is declared by the MIMO quality indicator, Method B is used.

Where a given UE MIMO receiving systems implements Spatial Multiplexing, RDN tuning is suboptimal due to the need to optimize for multiple uncorrelated transmissions (e.g. via SVD techniques); when reviewing multiple suboptimal solutions together, is sometimes possible to modify some or all of them so that the combined effect has higher performance; hence, Method B is used for this class of MIMO system.

According to some embodiments of the present invention RF control module is configured to tune the beamformers based on individual outputs of the baseband DSP modems, whenever a signal to interference-plus-noise ratio (SINR) is higher than a specified threshold.

Figure 7:
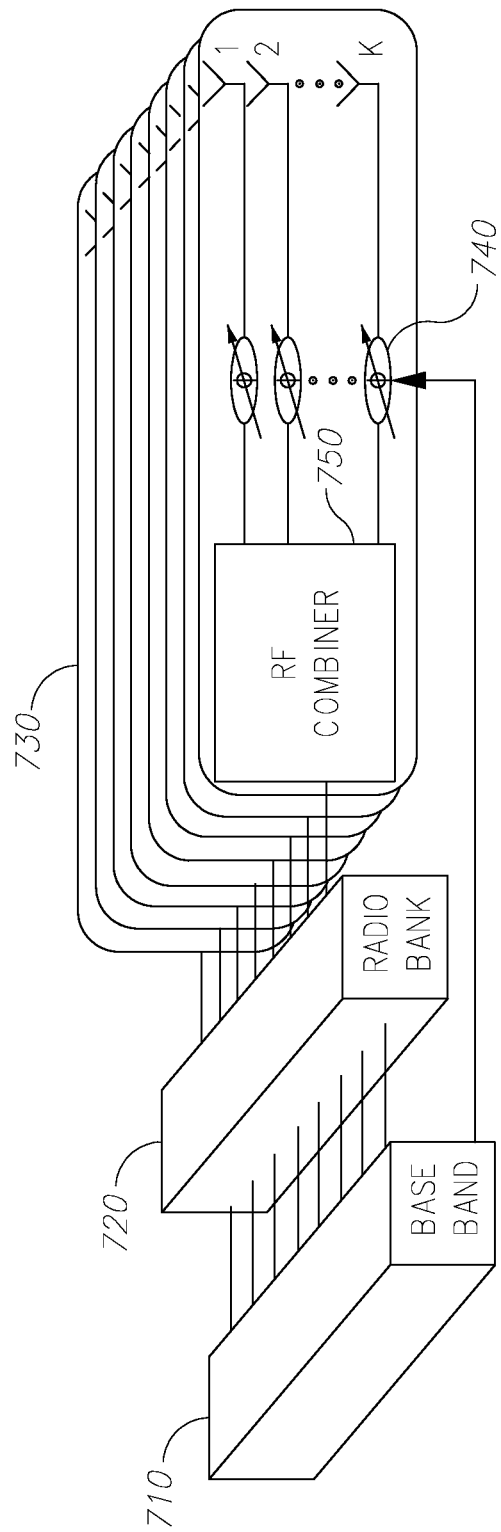
FIG. 7 is a high level block diagram illustrating general block diagram of a combination of a Rx RDN and legacy MIMO according some embodiments of the present invention.

FIG. 7 is a high level schematic block diagram illustrating yet another aspect according some embodiments of the present invention. FIG. 7 shows an RF MIMO receiver configuration including baseband processor 710 being input by radio bank circuits 720 which are in turn being input by beamforming circuits 730 which may include an RF combiner 750 wherein beamforming circuits 730 are tunable via control by baseband processor 710.

The aforementioned architecture of FIG. 7 may be beneficial to remedy a situation where antennas at the UE do not yield an approximately uniform wave front. The non-uniform wave-front yields unpredictable beam shapes when the antenna elements are combined with prescribed phases (and amplitude). One possible solution to produce more predictable beam shapes may be by using channel estimation of the signals by baseband 710 to better align the phases using phase shifter 740.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

We claim:

1. A system comprising:
   a multiple-input-multiple-output (MIMO) receiving system having N branches and configured to operate in accordance with one or more legacy MIMO receiving schemes;
   a radio distribution network (RDN) connected to the MIMO receiving system, the RDN comprising one or more beamformers, wherein at least one of the beamformers is fed by two or more antennas, so that a total number of antennas in the MIMO receiving system is M, wherein M is greater than N, wherein M and N are integers; and
   a controller configured to tune the one or more beamformers based on legacy MIMO metrics derived from the MIMO receiving system using a tuning method, wherein the MIMO receiving system comprises two or more Digital Signal Processing (DSP) modems, fed by two or more radio circuitries, each fed by a radio frequency (RF) beamformer, wherein the tuning method is selected based on a type of the legacy MIMO receiving scheme operated by the MIMO receiving system.

2. The system according to claim 1, wherein at least one of the beamformers is tunable using beamformer weights, based on radio links quality indicators.

3. The system according to claim 1, wherein the controller and the DSP modems are incorporated within a single integrated circuit.

4. The system according to claim 1, wherein the controller is configured to tune the at least one beamformer based on individual outputs of the DSP modems or a combined output thereof.

5. The system according to claim 4, wherein the controller is configured to select either the individual outputs of the DSP modems or the combined outputs thereof, based on the type of the legacy MIMO receiving schemes operated by the MIMO receiving system.

6. The system according to claim 5, wherein the one or more receiving schemes is based on an interference cancellation receiver, wherein the legacy MIMO metrics provide filtered signal at the combined output of the baseband DSP modems, so that the control module tunes the RDN using filtered quality indicators, as opposed to pre-filtered quality indicators.

7. The system according to claim 6, wherein the controller tunes the RDN based on individual outputs of the baseband DSP modems, whenever a signal to interference-plus-noise ratio (SINR) of the radio circuitries is higher than a specified threshold.

8. The system according to claim 1, wherein the MIMO receiving system is implemented within a user equipment (UE).

9. A system comprising:
   a multiple-input-multiple-output (MIMO) receiving system having N branches and configured to operate in accordance with one or more legacy MIMO receiving schemes;
   a radio distribution network (RDN) connected to the MIMO receiving system, the RDN comprising one or more beamformers, wherein at least one of the beamformers is fed by two or more antennas, so that a total number of antennas in the MIMO receiving system is M, wherein M is greater than N, wherein M and N are integers; and
   a controller configured to tune the one or more beamformers based on legacy MIMO metrics derived from the MIMO receiving system;
   wherein whenever a tuning of a specified beamformer is carried out while temporarily degrading its performance; the controller tunes the beamformers one at a time, so that when the specified beamformer is engaged in tuning, the other beamformers are not being engaged in tuning.

10. A system comprising:
    a multiple-input-multiple-output (MIMO) receiving system having N branches and configured to operate in accordance with one or more legacy MIMO receiving schemes;
    a radio distribution network (RDN) connected to the MIMO receiving system, the RDN comprising one or more beamformers, wherein at least one of the beamformers is fed by two or more antennas, so that a total number of antennas in the MIMO receiving system is M, wherein M is greater than N, wherein M and N are integers; and
    a controller configured to tune the one or more beamformers based on legacy MIMO metrics derived from the MIMO receiving system;
    wherein the one or more legacy MIMO receiving schemes is downlink (DL) beamforming, wherein the MIMO receiving system is implemented within a user equipment (UE), wherein the legacy MIMO metrics are measured every frame, and wherein the tuning of the one or more beamformers of the UE is carried out every more than one frame, and wherein a corresponding base station beamforming mechanism guided by the UE performs both channel estimation and code book instructions that change settings at the base station every frame.

11. A system comprising:
    a multiple-input-multiple-output (MIMO) receiving system having N branches and configured to operate in accordance with one or more legacy MIMO receiving schemes;

a radio distribution network (RDN) connected to the MIMO receiving system, the RDN comprising one or more beamformers, wherein at least one of the beamformers is fed by two or more antennas, so that a total number of antennas in the MIMO receiving system is M, wherein M is greater than N, wherein M and N are integers; and a controller configured to tune the one or more beamformers based on legacy MIMO metrics derived from the MIMO receiving system;

wherein the one or more legacy MIMO receiving schemes is downlink (DL) beamforming, wherein the MIMO receiving system is implemented within a user equipment (UE), wherein the controller keeps a logbook storing recent beamforming tuning for the one or more beamformers of the UE, and beamforming tuning of a base station, and wherein the controller is further configured to use the logbook to estimate an undesirable impact of a weights setting by one side on the other, so that the tuning of the one or more beamformers of the UE takes into account the estimated impact of UE weights setting.

12. A system comprising:
a multiple-input-multiple-output (MIMO) receiving system having N branches and configured to operate in accordance with one or more legacy MIMO receiving schemes;
a radio distribution network (RDN) connected to the MIMO receiving system, the RDN comprising one or more beamformers, wherein at least one of the beamformers is fed by two or more antennas, so that a total number of antennas in the MIMO receiving system is M, wherein M is greater than N, wherein M and N are integers; and
a controller configured to tune the one or more beamformers based on legacy MIMO metrics derived from the MIMO receiving system;
wherein the legacy MIMO receiving scheme performs a linear combination of various MIMO inputs, wherein the controller tunes the RDN beamformer based on respective individual DSP modems outputs, or on the combined modem output, subject to performance superiority.

13. A method comprising:
deriving legacy multiple-input-multiple-output (MIMO) metrics from a MIMO receiving system having N branches and configured to operate in accordance with one or more legacy MIMO receiving schemes;
generating beamforming weights for a radio distribution network (RDN) connected to the MIMO receiving system, the RDN comprising one or more beamformers, wherein at least one of the beamformers is fed by two or more antennas, so that a total number of antennas in the MIMO receiving system is M, wherein M is greater than N, wherein M and N are integers; and
tuning the one or more beamformers using the beamforming weights using a tuning method selected based on a type of the legacy MIMO receiving scheme operated by the MIMO receiving system,
wherein the deriving is carried out at individual outputs of digital signal processing (DSP) modems of the MIMO receiving system or at a combined output thereof.

14. The method according to claim 13, wherein the generating is carried out based on radio links quality indicators.

15. The method according to claim 13, wherein the one or more MIMO receiving schemes is based on an interference cancellation receiver, wherein the legacy MIMO metrics are measured at the individual outputs of the baseband DSP modems, whenever a signal to interference-plus-noise ratio (SINR) of at least one of the radio circuitries is higher than a specified threshold.

16. The method according to claim 13, wherein the one or more receiving schemes is based on an interference cancellation receiver, wherein the legacy MIMO metrics are measured at the combined output of the baseband DSP modems, so as to use a filtered quality indicators, as opposed to pre-filtered quality indicators.

17. The method according to claim 13, further comprising performing a linear combination of various MIMO inputs of the MIMO receiving system, wherein the tuning is carried out based on respective individual DSP modems outputs, or on a combined output of the DSP modems, subject to performance superiority.

18. A method comprising:
deriving legacy multiple-input-multiple-output (MIMO) metrics from a MIMO receiving system having N branches and configured to operate in accordance with one or more legacy MIMO receiving schemes;
generating beamforming weights for a radio distribution network (RDN) connected to the MIMO receiving system, the RDN comprising one or more beamformers, wherein at least one of the beamformers is fed by two or more antennas, so that a total number of antennas in the MIMO receiving system is M, wherein M is greater than N, wherein M and N are integers;
tuning the one or more beamformers using the beamforming weights; and
selecting either the individual outputs of the DSP modems or the combined outputs thereof, based on a type of the legacy MIMO receiving schemes operated by the MIMO receiving system.

19. A method comprising:
deriving legacy multiple-input-multiple-output (MIMO) metrics from a MIMO receiving system having N branches and configured to operate in accordance with one or more legacy MIMO receiving schemes;
generating beamforming weights for a radio distribution network (RDN) connected to the MIMO receiving system, the RDN comprising one or more beamformers, wherein at least one of the beamformers is fed by two or more antennas, so that a total number of antennas in the MIMO receiving system is M, wherein M is greater than N, wherein M and N are integers; and
tuning the one or more beamformers using the beamforming weights, wherein whenever a tuning of a specified beamformer is carried out by temporarily degrading its performance, tuning of the beamformers one at a time, so that when the specified beamformer is engaged in tuning, the other beamformers are not being engaged in tuning.

20. A method comprising:
deriving legacy multiple-input-multiple-output (MIMO) metrics from a MIMO receiving system having N branches and configured to operate in accordance with one or more legacy MIMO receiving schemes;
generating beamforming weights for a radio distribution network (RDN) connected to the MIMO receiving system, the RDN comprising one or more beamformers, wherein at least one of the beamformers is fed by two or more antennas, so that a total number of antennas in the MIMO receiving system is M, wherein M is greater than N, wherein M and N are integers; and
tuning the one or more beamformers using the beamforming weights, wherein the one or more legacy MIMO receiving schemes is downlink (DL) beamforming, wherein the MIMO receiving system is implemented within a user equipment (UE), wherein the legacy MIMO metrics are measured every frame, and wherein the tuning of the one or more beamformers of the UE is carried out every more than one frames, and wherein a corresponding base station beamforming mechanism guided by the UE performs both channel estimation and code book instructions that change setting, at the base station every frame.

21. A method comprising:
deriving legacy multiple-input-multiple-output (MIMO) metrics from a MIMO receiving system having N branches and configured to operate in accordance with one or more legacy MIMO receiving schemes;
generating beamforming weights for a radio distribution network (RDN) connected to the MIMO receiving system, the RDN comprising one or more beamformers, wherein at least one of the beamformers is fed by two or more antennas, so that a total number of antennas in the MIMO receiving system is M, wherein M is greater than N, wherein M and N are integers; and
tuning the one or more beamformers using the beamforming weights, wherein the one or more legacy MIMO receiving schemes is downlink (DL) beamforming, wherein the MIMO receiving system is implemented within a user equipment (UE), wherein the control module keeps a logbook storing recent beamforming tuning for the one or more beamformers of the UE, and beamforming tuning of a base station, and wherein the control module is further configured to use the logbook to estimate an undesirable impact of a weights setting by one side on the other, so that the tuning of the one or more beamformers of the UE takes into account the estimated impact of UE weights setting.

* * * * *